(12) United States Patent
Kopp et al.

(10) Patent No.: US 6,404,789 B1
(45) Date of Patent: Jun. 11, 2002

(54) CHIRAL LASER APPARATUS AND METHOD

(75) Inventors: Victor Il'ich Kopp, Flushing; Azriel Zelig Genack, New York, both of NY (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 09/468,148

(22) Filed: Dec. 21, 1999

Related U.S. Application Data

(60) Provisional application No. 60/113,192, filed on Dec. 21, 1998.

(51) Int. Cl.$^7$ ................................................ H01S 3/14
(52) U.S. Cl. .......................... 372/39; 372/43; 372/27; 372/54
(58) Field of Search ............................. 372/43, 39, 27, 372/54

(56) References Cited

U.S. PATENT DOCUMENTS

2001/0036212 A1 * 11/2001 Kopp et al. .................. 372/43

* cited by examiner

Primary Examiner—Leon Scott, Jr.
(74) Attorney, Agent, or Firm—Edward Etkin, Esq.

(57) ABSTRACT

A chiral laser apparatus comprises a layered structure configured to produce a photonic stop band, the layered structure including a upper chiral material layer, a middle excitable light-emitting layer, and a lower chiral material layer and an excitation source that, when applied to the layered structure, causes the middle light-emitting layer to emit electromagnetic radiation, such that polarized lasing at a lasing wavelength occurs in a direction perpendicular to the layered structure. The middle light-emitting layer may be configured to produce a defect such that lasing advantageously occurs at a wavelength corresponding to a localized photonic state within the photonic stop band. The excitation source may be an electrical power source connected to the layered structure via two or more electrodes. In another embodiment of the invention, the layered structure is replaced with a homogeneous chiral material doped with a light-emitting material. Excitation sufficient to cause lasing is provided by the electrical power source via a pair of electrodes connected to the chiral material. In yet another embodiment of the invention, the excitation source may be an electromagnetic wave source that applies an electromagnetic wave to the middle light-emitting layer to excite the middle layer sufficiently to cause lasing.

37 Claims, 5 Drawing Sheets

US 6,404,789 B1

CHIRAL LASER APPARATUS AND METHOD

RELATED APPLICATIONS

This application claims priority from U.S. Provisional Patent Application Serial No. 60/113,192 entitled "Photonic Stop Band Semiconductor Laser with Chiral Feedback" which was filed on Dec. 21, 1998.

FIELD OF THE INVENTION

The present invention relates generally to lasers based on chiral structures, and more particularly to electronically or optically pumped lasers utilizing cholesteric liquid crystal elements.

BACKGROUND OF THE INVENTION

Semiconductor lasers have found many industrial and commercial applications in recent years. For example lasers are used in telecommunications, in optically readable media pickups that are used in CD players, CD ROM drives and DVD players, in medical imaging, and in video displays. However, previously known semiconductor lasers have a number of disadvantages. For example, traditional semiconductor lasers, such as ones used in CD players, emit light from the edge of a chip, so it is necessary to cleave a wafer into chips and package the chip before knowing if the laser functions properly. Other types of light sources, such as LEDs do not provide the performance needed for certain applications.

Vertical Cavity Surface Emitted Lasers (hereinafter "VCSELs") have been developed to address the need for a more advanced, higher quality laser that can function well in a variety of applications. VCSELs combine the performance advantages of LEDs and edge-emitting lasers at costs comparable to LED solutions. VCSELs emit light vertically from the wafer surface, like LEDs, which means their fabrication and testing is fully compatible with standard I.C. procedures and equipment, and also means that arrays of VCSELs are feasible. Additionally, VCSELs are much faster, more efficient, and produce a smaller divergence beam than LEDs.

The VCSEL structure leads to a host of performance advantages over conventional semiconductor lasers.

1) small size
2) low power consumption
3) 2-dimensional array capabilities

In contrast to conventional edge-emitting semiconductor lasers, the surface-emitting VCSEL has a radially symmetric Gaussian near-field, greatly simplifying coupling to optical elements or fibers. In addition, VCSEL technology allows the fabrication of two-dimensional laser arrays.

However, VCSELS suffer from a number of disadvantages. The manufacture of VCSELs requires sophisticated and expensive mircofabrication. Since single-pass gain in thin layer semiconductor lasers is low, VCSELs incorporate highly reflective dielectric stacks which are integrated into the laser as Bragg reflectors (simulating a Distributed Feedback Laser). These consist of alternating layers of dielectric material, which are grown using methods of molecular beam epitaxy (MBE). This ensures a close match of the atomic lattice structures of adjacent layers. Alternating atomically ordered layers of materials with different electronic characteristics are thereby produced. The interfaces between the layers must be digitally graded and doped to reduce the electrical resistance.

Much work has been done to improve the performance of VCSELs by increasing the number of layers and/or the dielectric difference between alternating layers. However, this approach makes the fabrication more expensive and difficult. There is also a limit to the number of layers determined by the absorption in these layers. While VCSELs can be manufactured in two-dimensional arrays, there has been great difficulty in achieving uniform structure over large areas and in producing large area arrays. The materials typically used for VCSELs do not have the desired low absorption and high index contrast over a broad frequency range. In particular, it is difficult to achieve high reflectivity in the communication band around 1.5 microns.

In addition, VCSELs cannot be tuned in frequency since their periods cannot be changed. The density of photon modes is not changed appreciably by use of a low index contrast multilayer Bragg reflector and the gain cannot be improved in a VCSEL system as compared to that in an ordinary laser cavity. Also, an external device must be used to control the polarization of the light.

It would thus be desirable to provide a laser apparatus and method that has advantageous properties similar but superior to VCSELs and that has none of the VCSELs' disadvantages.

SUMMARY OF THE INVENTION

This invention relates to use of chiral structures combined with an excitable light-emitting material to produce lasing. A chiral laser apparatus comprises a layered structure configured to produce a photonic stop band, the layered structure including a upper chiral material layer, a middle excitable light-emitting layer, and a lower chiral material layer, and an excitation source that, when applied to the layered structure, causes the middle light-emitting layer to emit electromagnetic radiation, such that polarized lasing at a lasing wavelength, within or at an edge of the photonic stop band, is produced in a direction perpendicular to the layered structure. The middle light-emitting layer may be configured to produce a defect such that lasing advantageously occurs at a wavelength corresponding to a localized photonic state within the photonic stop band that preferably corresponds to a location of a maximum energy density within the layered structure. The excitation source may be an electrical power source connected to the layered structure via two or more electrodes. In another embodiment of the invention, the layered structure is replaced with a homogeneous cholesteric material doped with a light-emitting material. Excitation sufficient to cause lasing is provided by the electrical power source via a pair of electrodes connected to the cholesteric material. In yet another embodiment of the invention, the excitation source may be an electromagnetic wave source that applies an electromagnetic wave to the middle light-emitting layer to excite the middle layer sufficiently to cause lasing.

The inventive apparatus and method advantageously overcome the drawbacks of previously known edge-emitting lasers and VCSELs due to unique properties of chiral cholesteric) materials utilized in the various embodiments of the present invention. Specifically, the disadvantages of the prior art are overcome as follows:

1) In contrast to multi-layered structures, such as VCSELs, that are difficult to produce, the CLC films/ layers utilized in accordance with the present invention are self-organized structures that are readily fabricated;
2) The period of a CLC film/layer could be readily changed by applying an electric or magnetic field or changing temperature or pressure so that the laser output could be tuned in frequency within the gain band of the light-emitting middle layer;

3) The band structure of a CLC film/layer leads to an increase in the local density of photon modes over wavelength range. This in turn results in an improvement in gain and in a reduction of the lasing threshold; and 4) The polarization of the laser output is determined by the CLC structure. Thus the laser beam is right or left circularly or linearly polarized without requiring any external device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views.

DETAILED DESCRIPTION OF PREFERRED EMBODIMENTS

The present invention is described with reference to cholesteric liquid crystal materials by way of example only—it should be understood that the apparatus and method of present invention may be utilized with any chiral material having properties similar to cholesteric liquid crystals, without departing from the spirit of the invention. Furthermore, a variety of electrodes is described in connection with the present invention. It should be understood that unless otherwise specified, any electrode shape may be used as a matter of design choice without departing from the spirit of the invention.

Figure 3A:
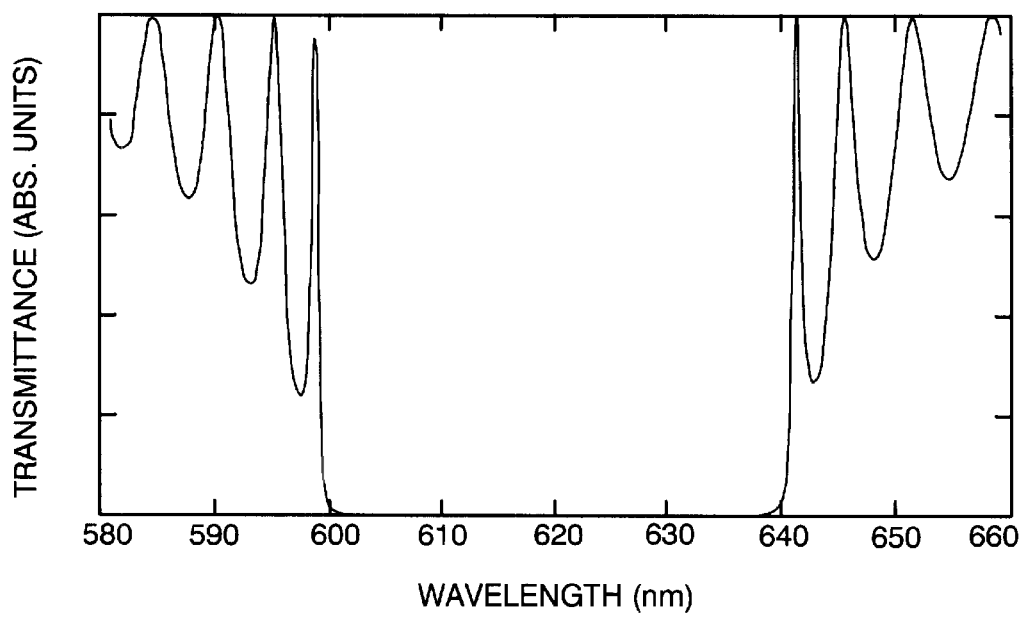
FIG. 3A is a graph diagram of incident light transmittance plotted versus wavelength in connection with a computer simulated implementation of the seventh embodiment of FIG. 1H in accordance with the present invention.

Before describing the present invention in greater detail, it would be helpful to provide definitions of common terms utilized in the dielectric lasing art. "Chiral" materials are not symmetrical on a molecular level—that is molecules of chiral materials are not identical to their mirror images. Cholesteric materials, such as cholesteric liquid crystals (hereinafter "CLCs"), have multiple molecular layers where molecules in the different layers are oriented on average at a slight angle relative to molecules in other layers. Molecules in consecutive layers are rotated slightly relative to those in the preceding layer. Thus, the average direction of the molecules, known as a "director", rotates helically throughout the cholesteric material. A pitch of a cholesteric material is defined as a thickness of the material in which the director rotates a full 360 degrees. Cholesteric structures also have a property called "handedness"—they may be right-handed or left-handed depending on the direction of rotation of the molecules from layer to layer. The handedness of a cholesteric structure determines the circular polarization and amplitude of light passing through the structure. CLCs have a particular reflection band (hereafter referred to as a "photonic stop band") which is a result of its periodic structure—a range of wavelengths where there is no transmission of light through the structure due to reflection. At the edge of the photonic stop band gap there are a series of narrow photonic states (or modes) at the peak of which transmission of light reaches unity. The spectral width of these states is proportional to the inverse of the dwell time for the photons within the CLC medium. The long dwell time of photons in spectrally narrow states facilitates lasing at the frequency of these modes in activated materials since emitted photons are given greater opportunity to stimulate emission before they emerge from the CLC medium. Since the photon lifetime is longest for the state closest to the photonic stop band edge and falls rapidly with state number from the edge, lasing occurs in the wavelength corresponding to the first state or corresponding to a few states closest to the photonic stop band edge. This is taught by the commonly-assigned "Stop Band Laser" patent application of A. Z. Genack et al. (Ser. No. 09/302,630, filed Apr. 30, 1999) which discloses that in a generally homogeneous CLC structure lasing advantageously occurs at the edges of the photonic stop band due to the higher density of photonic states therein. This arrangement is illustrated in FIG. 3A, and is discussed in greater detail below in connection with FIGS. 1H and 3A.

When a defect, such as spacing, a pitch shift, or an additional layer of a foreign substance is introduced into a CLC structure, or when the CLC structure comprises two or more CLC structures having different pitches or refractive indices, then an additional localized photonic state or number of photonic states may be introduced into the photonic stop band. Maximum efficiency lasing occurs at the frequency of the localized state.

Referring initially to FIG. 1, in a first embodiment of the present invention, a chiral laser 10 includes an active light-emitting material 12 for producing gain, such as a light-emitting diode (e.g. a GaAs diode), sandwiched between an upper cholesteric liquid crystal ("CLC") layer 14 and a lower CLC layer 16. The light-emitting material 12 may include, but is not limited to: laser dyes, rare earth elements, conjugated polymers or any medium in which electron-hole recombination occurs in the active material. As noted above, the CLC layers 14 and 16 may be composed from any chiral substance capable of transmitting light.

A first electrode 18 is connected to the upper CLC layer 14 and a second electrode 20 is connected to the lower CLC layer 20. Both electrodes 18 and 20 are connected to an external electrical power source 22. The power source 22 may be any electrical current source capable of providing charge current between electrodes connected thereto. Optionally, the CLC layers 14 and 16 and the light-emitting layer 12 may all be incorporated into a single conjugated polymer having a structure of a CLC.

When a voltage V__1 is applied between electrodes 18 and 20 by the power source 22, a charge current passes through the light-emitting material 12, exciting it and causing emission of electromagnetic radiation that through stimulated emission causes polarized lasing at a predefined lasing wavelength. Because the charge current must pass through both CLC layers 14 and 16, preferably, the CLC layers 14 and 16 are substantially conductive. Optionally, the upper CLC layer 14 is configured to conduct electrons, while the lower CLC layer 16 is configured to conduct holes. When voltage V__1 is applied by the power source 22, electrons and holes flow into the light-emitting material 12 and recombine to emit light. Lasing occurs in a direction perpendicular to the CLC layers 14 and 16. The pitches of the CLC layers 14 and 16 are preferably substantially identical. Alternately, the pitches of the CLC layers 14 and 16 may be varied by application of heat, temperature, and/or pressure to shift the photonic stop band, and thus to tune the lasing wavelength.

The wavelength at which lasing occurs and the lasing threshold and efficiency depend on a number of factors. If the light-emitting material 12 is much thinner than the wavelength of light and if the CLC layers 14 and 16 are substantially identical, then lasing occurs at a wavelength corresponding to a photonic state at one of the edges of the photonic stop band. However, in the majority of cases, the light-emitting material 12 functions as a defect and thus causes a localized photonic state within the photonic stop band. Since the dwell time of photons emitted into the localized state in a CLC medium having a defect is greatly enhanced over the photon dwell time in a homogeneous CLC medium, the intensity of the light inside the medium is greatly enhanced and is peaked at the position of the localized state. Thus, to advantageously achieve maximum lasing efficiency and power, the light-emitting material 12 should be placed in a position between the CLC layers 14 and 16 such that the peak gain emission of the light-emitting material 12 coincides with the position of the localized photonic state (resulting from the defect) in the photonic stop band. To further centralize the localized photonic state within the photonic stop band so that it corresponds with peak gain of the emission band of the light-emitting material 12, the size of the light-emitting material 12 should be approximately one quarter of a wavelength of light inside the layered structure formed by the CLC layers 14 and 16 and the light-emitting material 12.

Figure 2A:
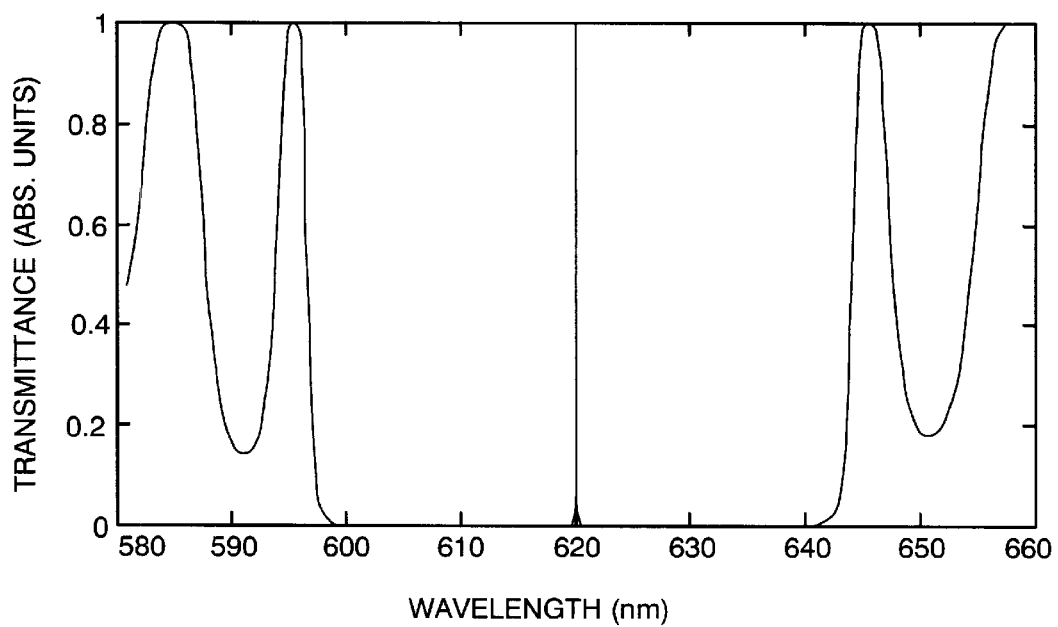
FIG. 2A is a graph diagram of incident light transmittance plotted versus wavelength in connection with a computer simulated implementation of the first embodiment of FIG. 1A in accordance with the present invention.
Figure 2B:
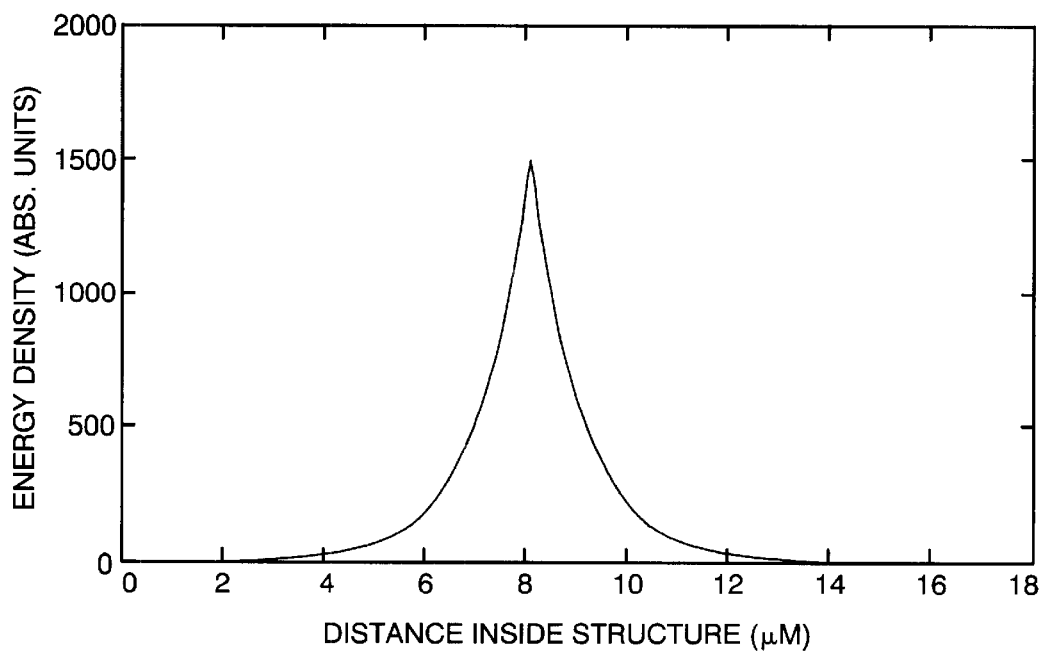
FIG. 2B is a graph diagram of energy density plotted versus distance inside the chiral laser structure of the first embodiment of the chiral laser of FIG. 1A in connection with a computer simulated implementation of the first embodiment of FIG. 1A in accordance with the present invention.

Referring now to FIGS. 2A and 2B, graphs of transmittance and energy density properties of an exemplary chiral laser 10 simulated by a computer system are shown. In the exemplary chiral laser 10, the CLC layers 14 and 16 are right handed structures, each having a thickness of 8 $\mu$m, and the light-emitting material 12, comprising a defect, has a thickness of 0.1 $\mu$m, such that the total thickness of the layered structure is 16.1 $\mu$m. The ordinary and extraordinary indices of refraction of the CLC layers 14 and 16—$n_o$ and $n_e$, are 1.5 and 1.6, respectively. The index of refraction of the light-emitting material is 1.55, which is the average of the ordinary and extraordinary indices of refraction of the CLC layers 14, 16. Thus, the light-emitting material 12 has an optical thickness of one quarter of the lasing wavelength. No gain is applied to the layered structure 14, 12, 16. In FIG. 2A, a graph of light transmittance versus wavelength shows a localized defect mode in the middle of the photonic stop band at the wavelength of 620 nm. This defect has an extraordinarily narrow mode (0.025 nm), and correspondingly the dwell time for optical energy intensity inside the layered structure is high. This results in a low laser threshold for the chiral laser 10 when the light-emitting layer 12 possesses gain, for example form application of voltage V__1 thereto.

In FIG. 2B, a graph shows energy density versus position inside the layered structure 14, 12, 16 when the layered structure is illuminated with light at the frequency of the sharp mode at 620 nm (shown in FIG. 2A). The graph shows that the energy distribution within the layered structure 14, 12, 16 reaches a peak equal to approximately 1,500 times the incident intensity. The energy density is peaked at the defect site—i.e. the position of the light-emitting material 12—reaching a peak equal to approximately 1,500 times the incident intensity. Preferably, any gain is applied to the light-emitting material 12 of the chiral laser 10 is peaked at the defect location to minimize the lasing threshold.

In order for lasing to occur when the charge current is applied to the light-emitting material 12, one or both of the electrodes 18 and 20 must be substantially transparent. If both electrodes are transparent then lasing occurs both from the upper CLC layer 14 and from the lower CLC layer 16. If only one of the electrodes 18 and 20 is transparent, then lasing emission only emerges from the CLC layer that is in contact with the transparent electrode. Transparent electrodes are known in the art and may be composed from ITO (Indium Tin Oxide) or from any other substantially transparent highly conductive substances. Furthermore, transparent electrodes of different work functions may be produced by attaching monolayers of molecules to an ITO electrode.

Figure 1A:
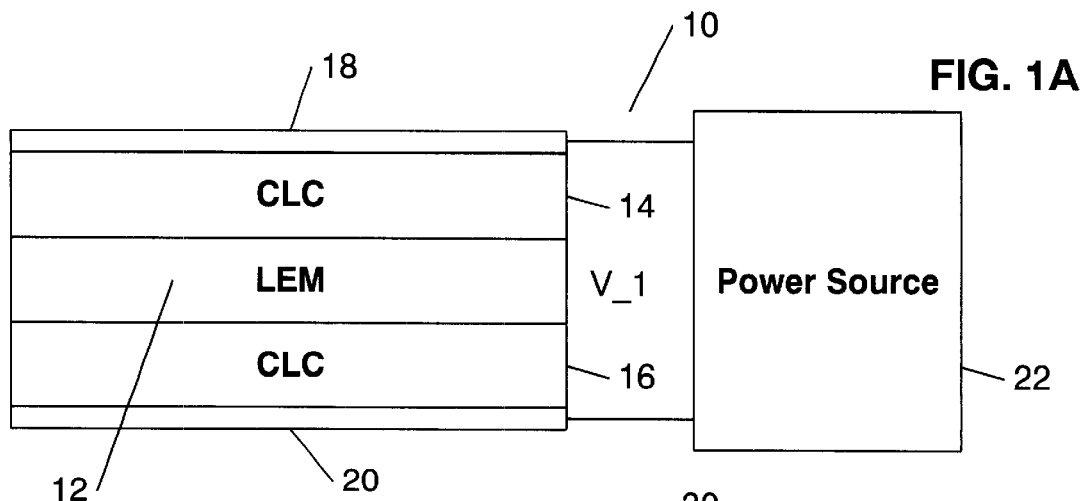
FIG. 1A is a schematic diagram of a first embodiment of a chiral laser of the present invention, in which the chiral laser is composed of a light-emitting layer sandwiched between cholesteric layers, and wherein the chiral laser is electrically pumped.
Figure 1B:
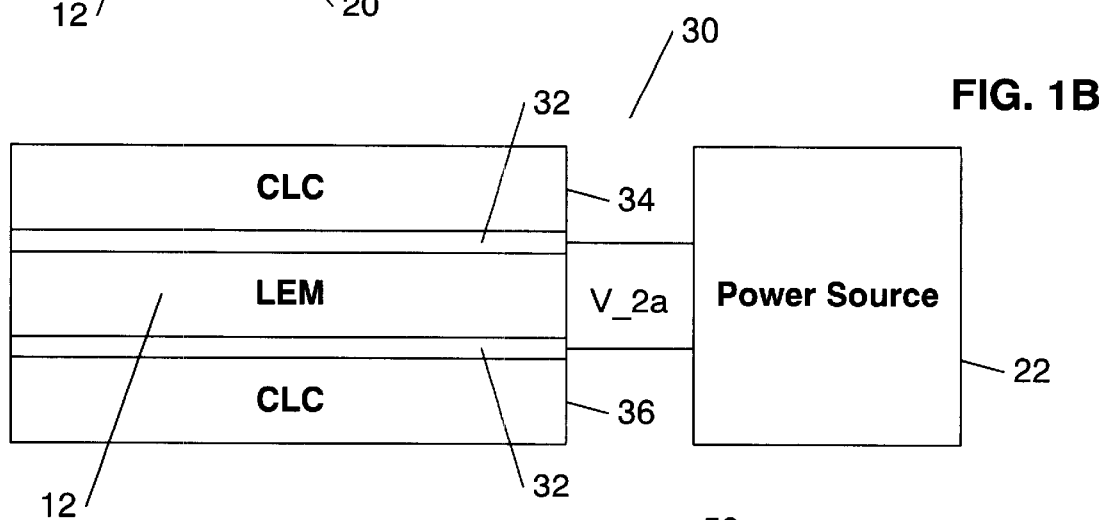
FIG. 1B is a schematic diagram of a second embodiment of a chiral laser of the present invention, in which the chiral laser is composed of a light-emitting layer sandwiched between cholesteric layers, and wherein the chiral laser is electrically pumped.

Referring now to FIG. 1B, a second embodiment of the invention is shown as a chiral laser 30. The chiral laser 30 includes an active light-emitting material 12 for producing gain, sandwiched between an upper CLC layer 34 and a lower CLC layer 36. As noted above, the CLC layers 34 and 36 may be composed from any chiral substance capable of transmitting light.

A first electrode 32 is positioned between the upper CLC layer 34 and the light-emitting material 12, while a second electrode 32 is positioned between the light-emitting material 12 and the lower CLC layer 36. Both electrodes 32 are connected to the external electrical power source 22. When a voltage $V\_2a$ is applied between electrodes 32 by the power source 22, a charge current passes through the light-emitting material 12, exciting it and causing spontaneous and stimulated emission of electromagnetic radiation that results in polarized lasing at a predefined lasing wavelength. Lasing occurs in a direction perpendicular to the CLC layers 34 and 36. The pitches of the CLC layers 34 and 36 are preferably substantially identical. Alternately, the pitches of the CLC layers 34 and 36 may be varied by application of heat, voltage, temperature, and/or pressure to shift the photonic stop band and thus to tune the lasing wavelength.

The chiral laser 30 operates substantially in a similar manner to the chiral laser 10 with the exception of the following differences. Because the charge current is applied directly to the light-emitting material 12, the CLC layers 34 and 36 need not be conductive. Furthermore, $V\_2a$ can be significantly lower than $V\_1$ of FIG. 1A because the charge current does not need to overcome the resistance of two CLC layers. Both of these factors decrease the complexity and power requirements of the chiral laser 30. However, because light must pass through both electrodes 32, the electrodes 32 must be substantially transparent. A lower electrode transparency directly results in optical loss which can inhibit lasing. Because perfectly transparent electrodes do not currently exist, the chiral laser 30 may be less efficient than the chiral laser 10.

Figure 1C:
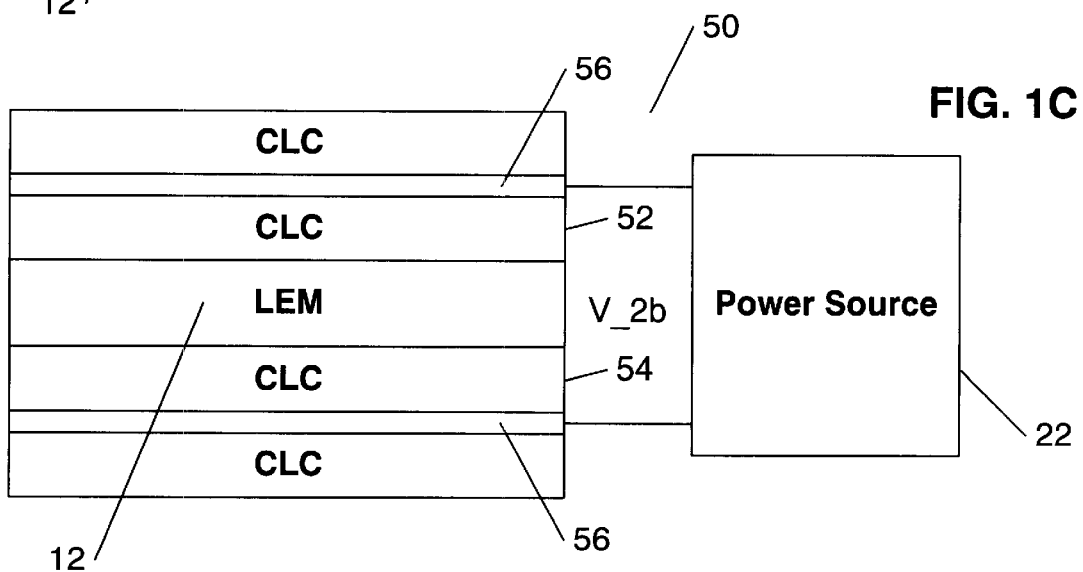
FIG. 1C is a schematic diagram of a third embodiment of a chiral laser of the present invention, in which the chiral laser is composed of a light-emitting layer sandwiched between cholesteric layers, and wherein the chiral laser is electrically pumped.

Referring now to FIG. 1C, a third embodiment of the present invention is shown as a chiral laser 50. The chiral laser 50 includes an upper CLC layer 52, a light-emitting material layer 12, a lower CLC layer 54, a first electrode 56 embedded within the upper CLC layer 52 and a second electrode 56 embedded within the lower CLC layer 54. Both electrodes are connected to the power source 22. The chiral laser 50 operates substantially in a similar manner to the chiral laser 30 except that the electrodes 56 need not be as transparent as electrodes 32, and the CLC layers 52 and 54 must be conductive. The voltage $V\_2b$ applied by the power source 22 is between $V\_1$ and $V\_2a$. Thus, the chiral laser 50 is less sensitive to the transparency of the electrodes than the chiral laser 30, but requires a higher voltage and more complex fabrication techniques.

Figure 1D:
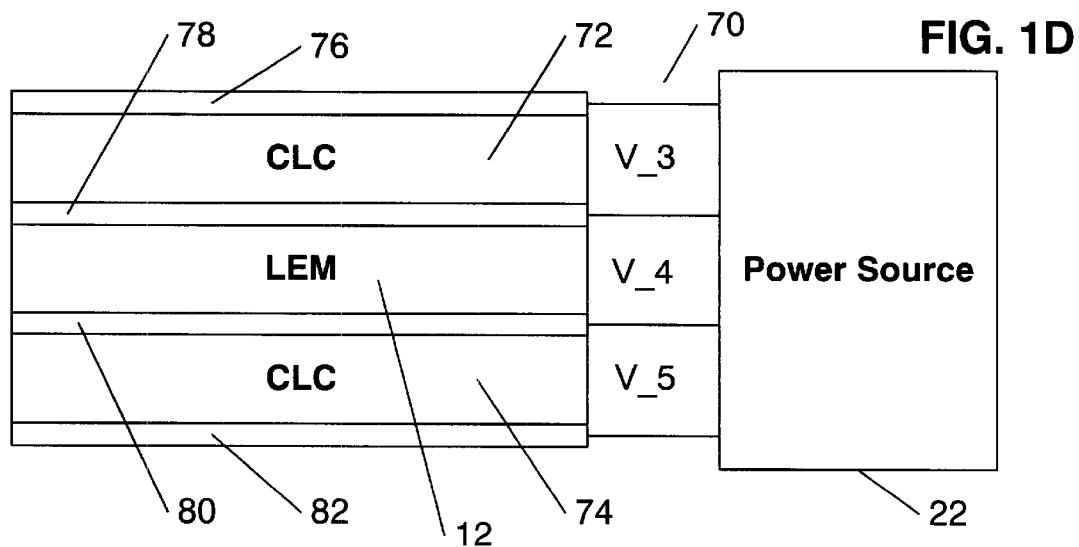
FIG. 1D is a schematic diagram of a fourth embodiment of a chiral laser of the present invention, in which the chiral laser is composed of a light-emitting layer sandwiched between cholesteric layers, and wherein the chiral laser is electrically pumped.

Referring now to FIG. 1D, a fourth embodiment of the present invention is shown as a chiral laser 70. The chiral laser 70 includes an active light-emitting material 12 for producing gain, sandwiched between an upper CLC layer 72 and a lower CLC layer 74. The light-emitting material 12 may include, but is not limited to: laser dyes, rare earth elements, conjugated polymers or any other medium in which electron-hole recombination occurs in the active material. As noted above, the CLC layers 72 and 74 may be composed from any chiral substance capable of transmitting light. Preferably, the CLC layers 72 and 74 are substantially conductive. The upper CLC layer 72 is sandwiched between a first electrode 76 and a second electrode 78, the light-emitting material 12 is sandwiched between the second electrode 78 and a third electrode 80, and the lower CLC layer 74 is sandwiched between the third electrode 80 and a fourth electrode 82. All electrodes 76, 78, 80, 82 are connected to the power source 22. Preferably, electrodes 78 and 80 are substantially transparent. One or both of the electrodes 76 and 82 may be substantially transparent depending on the desired lasing direction. The chiral laser 70 can operate in a similar manner to chiral laser 10 when voltage is applied between electrodes 76 and 82, or in a similar manner to chiral laser 30 when a voltage $V\_4$ is applied between electrodes 78 and 80.

The lasing wavelength of the chiral laser 70 may be advantageously dynamically tuned. By applying one or both voltages $V\_3$ and $V\_5$ to the respective CLC layers 72 and/or 74, the pitch of the individual CLC layers 72 and 14 may be varied proportionally to the magnitude of the voltages $V\_3$ or $V\_5$. As the pitch changes, the photonic stop band shifts in wavelength and thus, the lasing wavelength is dynamically tuned. Depending on the composition and type of the CLC layers 72 and 74, a sufficiently high voltage $V\_3$ or $V\_5$ can shift the photonic stop band to such a degree as to prevent lasing from a corresponding CLC layer.

Figure 1E:
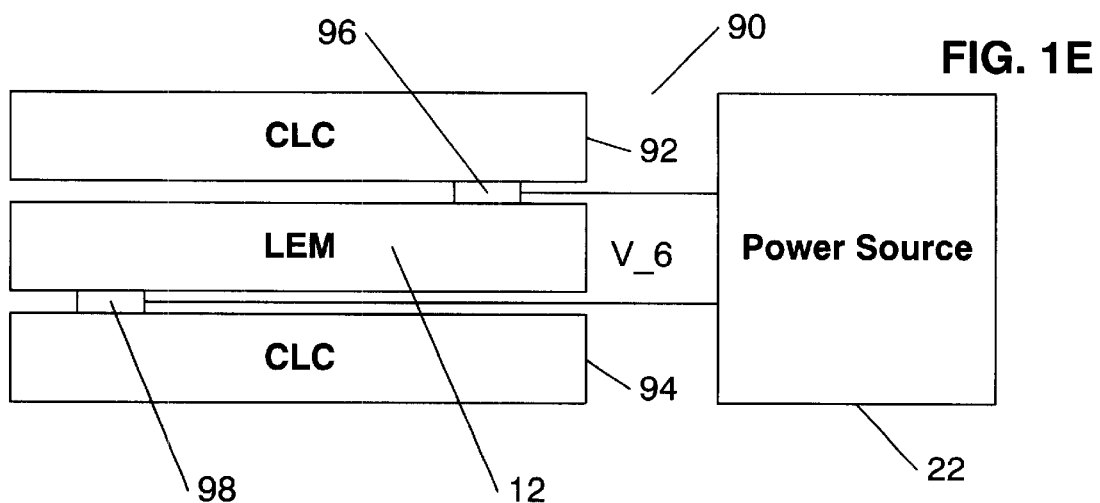
FIG. 1E is a schematic diagram of a fifth embodiment of a chiral laser of the present invention, in which the chiral laser is composed of a light-emitting layer sandwiched between cholesteric layers and wherein the chiral laser is electrically pumped.

Referring now to FIG. 1E, a fifth embodiment of the present invention is shown as a chiral laser 90. The chiral laser 90 includes an active light-emitting material 12 for producing gain, sandwiched between an upper CLC layer 92 and a lower CLC layer 94. As noted above, the CLC layers 92 and 94 may be composed from any chiral substance capable of transmitting light.

A first electrode 96 is positioned between the upper CLC layer 92 and the light-emitting material 12, the electrode 96 being substantially smaller than the CLC layer 92 and the light-emitting material 12. A second electrode 98 is positioned between the light-emitting material 12 and the lower CLC layer 94 in a position offset from the position of the electrode 96, the electrode 98 also being substantially smaller than the CLC layer 94 and the light-emitting material 12. Both electrodes 96 and 98 are connected to the external electrical power source 22. When a voltage $V\_6$ is applied between electrodes 96 and 98 by the power source 22, a charge current passes through and along the light-emitting material 12, exciting it and causing emission of electromagnetic radiation that through stimulated emission causes polarized lasing at a predefined lasing wavelength.

The chiral laser 90 operates substantially in a similar manner to the chiral laser 30 with the exception of the following differences. Because the electrodes 96 and 96 are small and offset from one another their transparency is not as important as the transparency of the electrodes 32. However because of the positioning and small surface area of the electrodes 96 and 98, excitation of the light-emitting material 12 may not be evenly distributed and thus the chiral laser 90 may operate at a lower efficiency than a chiral laser 30 with highly transparent electrodes 32. While only two electrodes 96 and 98 are shown in FIG. 1E, optionally, a large number of small offset electrodes 96 and 98 may be provided to effectively excite a sufficiently large area of the light-emitting material 12 while limiting the distance charge that must flow in the light-emitting material 12 between electrodes 96 and 98.

Figure 1F:
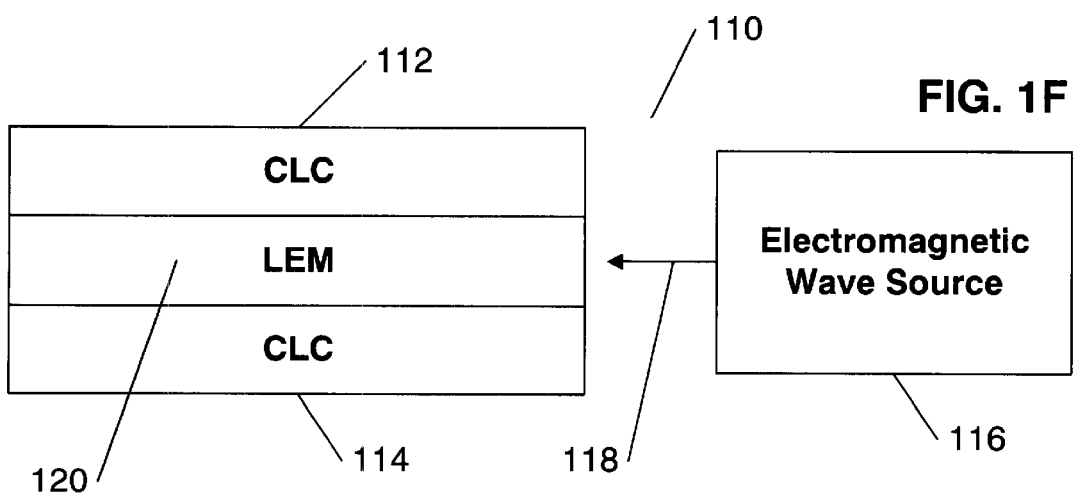
FIG. 1F is a schematic diagram of a sixth embodiment of a chiral laser of the present invention, in which the chiral laser is composed of a light-emitting layer sandwiched between cholesteric layers and wherein the chiral laser is optically pumped.

Referring now to FIG. 1F, a sixth embodiment of the present invention is shown as a chiral laser 110. The chiral laser 90 includes an active optically excitable light-emitting material 120 for producing gain when subjected to an electromagnetic wave, sandwiched between an upper CLC layer 112 and a lower CLC layer 114. The active optically excitable light-emitting material 120 may comprise, but is not limited to: rare earth doped material, chelated rare earth doped material, semiconductor materials, organic light-emitting materials, conjugated polymers, dye-doped material, and materials containing color centers. As noted above, the CLC layers 112 and 114 may be composed from any chiral substance capable of transmitting light. An electromagnetic wave source 116, such as a laser, a flash lamp, focused sunlight, or light-emitting diode radiates an electromagnetic wave 118 to excite the active optically excitable light-emitting material 120 and to thereby cause lasing in a manner similar to the chiral laser 10 of FIG. 1A. Alternatively, the electromagnetic wave source 116 may comprise an electroluminescent material embedded within the active optically excitable light-emitting material 120 such that when the electro-luminescent material is electronically pumped from an external power source (not shown), the electro-luminescent material emits an electromagnetic wave to excite the active optically excitable light-emitting material 120.

Figure 1G:
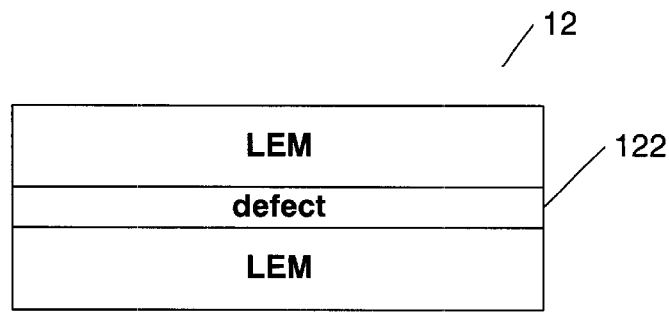
FIG. 1G is a schematic diagram of a light-emitting material layer of FIGS. 1A to 1F having a defect introduced therein in accordance with the present invention.

Referring to FIG. 1G, an exemplary light-emitting material 12 having an artificially formed defect 122 therein is shown. The defect 122 may be physical spacing, or a dielectric structure with a different refractive index from the light-emitting material. The light-emitting material 12 of FIG. 1G can be utilized in any of the embodiments of the present invention illustrated in FIGS. 1A to 1F where lasing at a localized photon state within the photonic stop band is desirable. Preferably, the defect 122 is configured such that the overall thickness of the light-emitting material 12 is approximately one quarter of a wavelength of light inside the layered structure formed by the upper and lower CLC layers and the light-emitting material 12.

Figure 1H:
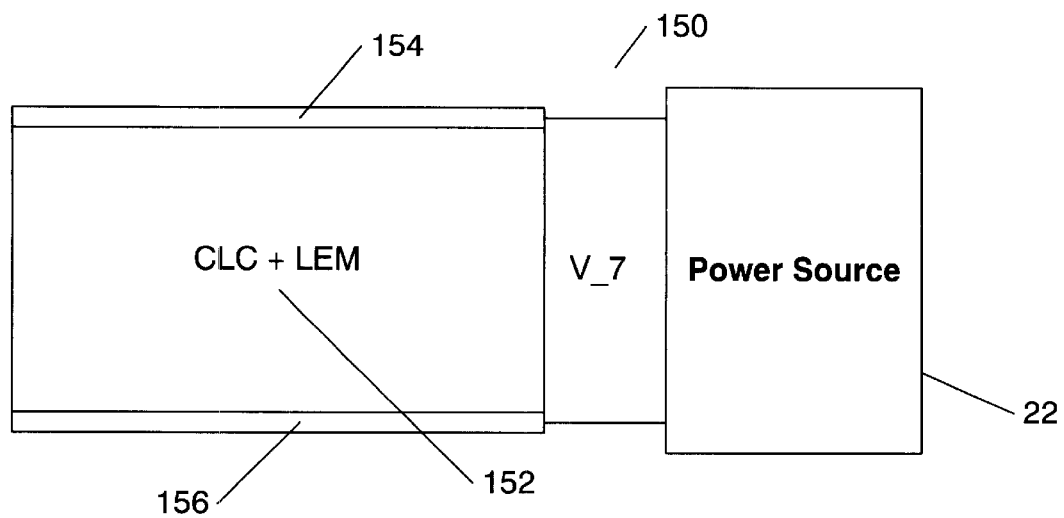
FIG. 1H is a schematic diagram of a seventh embodiment of a chiral laser of the present invention, in which the chiral laser is composed of a single cholesteric layer doped with a active electroluminescent material, and wherein the chiral laser is electrically pumped.

Referring now to FIG. 1H, a seventh embodiment of the present invention is shown as a chiral laser 150. The chiral laser 150 differs from the previously described embodiments in that instead of a layered CLC and light-emitting material structure, the chiral laser 150 includes a single CLC layer 152 doped with a light-emitting electrically excitable material, such as materials utilized in the light-emitting material 12 of FIG. 1A, sandwiched between electrodes 154 and 156. The electrodes 154 and 156 are connected to the power source 22. When a voltage V_7 is applied by the power source 22 between the electrodes 154 and 156, a charge current passes through the doped CLC layer 152 and excites the light-emitting material distributed therein causing lasing perpendicular to the doped CLC layer 152. Because the CLC layer 152 is homogeneous and without a defect, the most advantageous lasing wavelength is centered at the edge of the photonic stop band of the structure. Preferably, the light-emitting material distributed throughout the doped CLC layer 152 is selected such that the peak gain emission corresponds, or is close to, the band edge of the photonic stop band.

Figure 3B:
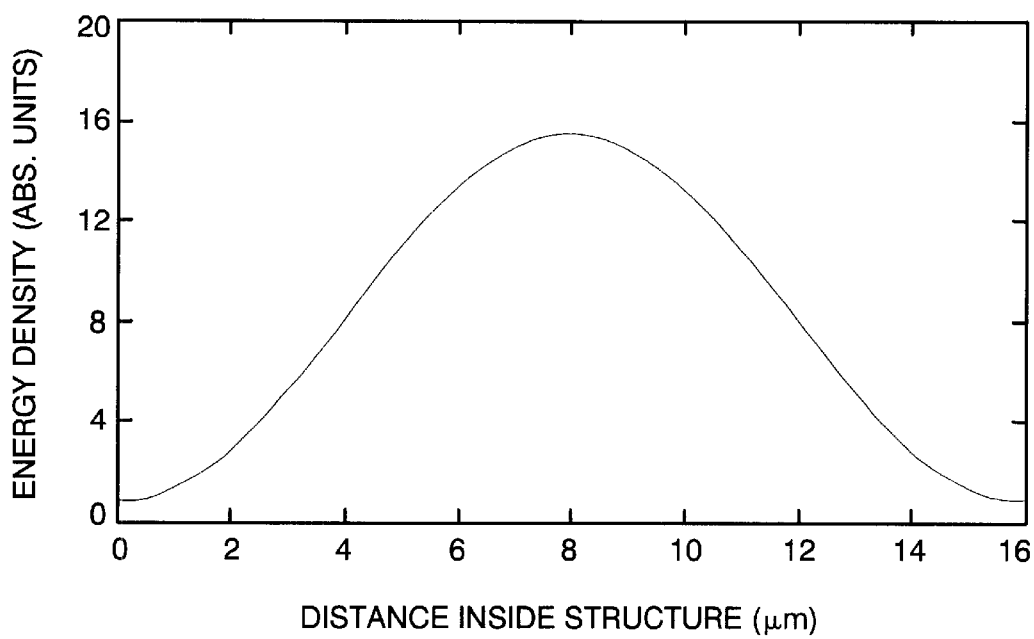
FIG. 3B is a graph diagram of energy density plotted versus distance inside the chiral laser structure of the seventh embodiment of the chiral laser of FIG. 1H in connection with a computer simulated implementation of the seventh embodiment of FIG. 1H in accordance with the present invention

Referring now to FIGS. 3A and 3B graphs of transmittance and energy density properties of a computer simulated exemplary chiral laser 150 are shown. The exemplary doped CLC layer is a right handed structure, has a thickness of 16 $\mu$m, while the ordinary and extraordinary indices of refraction, $n_o$ and $n_e$, are 1.5 and 1.6, respectively. In FIG. 3A, a graph of light transmittance versus wavelength shows the first four modes (i.e. photonic states) at each of the band edges of the photonic stop band of the exemplary chiral laser 150. These narrow modes are nonetheless much broader than the localized mode at the middle of the band gap. In FIG. 3B, a graph of energy density versus distance inside the doped CLC layer 152 shows the energy distribution inside the doped CLC layer 152 for the first mode at the band edge. The spatial distribution is broader than for the defect state at 620 nm shown in FIG. 2A. and the enhancement of the energy density over first mode for an incident wave at the point of peak intensity is a factor of 16. This enhancement is smaller than the enhancement for the defect state in the middle of the band gap, as shown in FIGS. 2A and 2B by a factor of 100. As a result, the chiral laser 150 has a higher lasing threshold than the chiral laser 10.

Thus, while there have shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral laser apparatus comprising:
    a layered structure having a top portion and a bottom portion and configured to produce a photonic stop band having a first predefined wavelength range, said layered structure comprising:
        an upper chiral material layer having a first pitch,
        a middle excitable light-emitting layer, and
        a lower chiral material layer having a second pitch; and
    an excitation means, applied to said layered structure, for causing said middle light-emitting layer to emit electromagnetic radiation, such that polarized lasing at a lasing wavelength occurs in a direction perpendicular to said layered structure.

2. The chiral laser apparatus of claim 1, wherein said middle light-emitting layer comprises a substantial defect, wherein said middle light-emitting layer is configured to produce gain peaked at a wavelength substantially corresponding to a defect photonic state within said photonic stop band, such that maximum efficiency lasing occurs at said lasing wavelength corresponding to a position of a defect photonic state within said photonic stop band.

3. The chiral laser apparatus of claim 2, wherein said substantial defect comprises a defect material layer embedded within said middle light-emitting layer, said defect material layer being configured to produce a defect photonic state localized substantially at the center of said photonic stop band, said localized defect photonic state corresponding to said lasing wavelength and to peak gain emission of said middle light-emitting layer.

4. The chiral laser apparatus of claim 3, wherein said defect material layer has an optical thickness of approximately one quarter of said lasing wavelength inside said layered structure.

5. The chiral laser apparatus of claim 1, wherein said middle light-emitting layer is composed of a material adapted to emit electromagnetic radiation upon application of an electromagnetic wave thereto, and wherein said excitation means comprises an electromagnetic wave source configured to apply said electromagnetic wave to said layered structure to excite said middle light-emitting layer to emit electromagnetic radiation.

6. The chiral laser apparatus of claim 5, wherein said electromagnetic wave source is selected from a group consisting of: a laser, a flash lamp, focused sunlight, a light-emitting diode, and an electrically pumped electro-luminescent material embedded within said middle light-emitting layer.

7. The chiral laser apparatus of claim 5, wherein said middle light-emitting layer comprises at least one material selected from a group consisting of rare earth doped material, chelated rare earth doped material, semiconductor materials, organic light-emitting materials, conjugated polymers, dye-doped material, and materials containing color centers.

8. The chiral laser apparatus of claim 1, wherein said middle light-emitting layer does not comprise a substantial defect and wherein said middle light-emitting layer is configured to produce gain peaked at a wavelength range substantially corresponding to a at least one selected mode at one band edge of said photonic stop band, such that maximum efficiency lasing occurs at a lasing wavelength selected from said wavelength range.

9. The chiral laser apparatus of claim 1, wherein each said upper and lower chiral material layers are selected from a group consisting of: cholesteric liquid crystal, conjugated polymer chiral material, artificially created chiral structure, naturally occurring chiral structure, a chiral substance configured to conduct electrons, and a chiral substance configured to conduct holes.

10. The chiral laser apparatus of claim 1, wherein said middle light-emitting layer is composed of a material adapted to emit electromagnetic radiation upon application of a charge current thereto, and wherein said excitation means comprises:
    a plurality of electrodes connected to said layered structure; and
    an electrical power source, connected to said plurality of electrodes for providing said charge current to the said layered structure to excite said middle light-emitting layer to emit electromagnetic radiation.

11. The chiral laser apparatus of claim 10, wherein said upper and lower chiral material layers are conductive, wherein said plural electrodes comprise a first electrode positioned above and in contact with said upper chiral material layer and a second electrode positioned below and in contact with said lower chiral material layer, such that said charge current is delivered to said middle light-emitting layer through said upper and lower chiral material layers, and wherein at least one of said first and second electrodes is substantially transparent, such that when said charge current is applied to said middle light-emitting layer, lasing occurs perpendicular to said at least one substantially transparent electrode.

12. The chiral laser apparatus of claim 10, wherein said plural electrodes comprise a first substantially transparent electrode positioned between said upper chiral material layer and said middle light-emitting layer, and a second substantially transparent electrode positioned between said middle light-emitting layer and said lower chiral material layer, such that said charge current is delivered directly to said middle light-emitting layer.

13. The chiral laser apparatus of claim 10, wherein said upper and lower chiral material layers are conductive, wherein said plural electrodes comprise a first substantially transparent electrode embedded within said upper chiral material layer and a second substantially transparent electrode positioned embedded within said lower chiral material layer, such that said charge current is delivered to said middle light-emitting layer through at least a portion of each of said upper and lower chiral material layers.

14. The chiral laser apparatus of claim 10, wherein said upper and lower chiral material layers are conductive, wherein said plural electrodes comprise:
    a first substantially transparent electrode positioned above and in contact with said upper chiral material layer;
    a second substantially transparent electrode positioned between said upper chiral material layer and said middle light-emitting layer;
    a third substantially transparent electrode positioned between said middle light-emitting layer and said lower chiral material layer, such that said charge current is applied between said second and third electrodes; and
    a fourth substantially transparent electrode positioned below and in contact with said lower chiral material layer.

15. The chiral laser apparatus of claim 14, further comprising means for tuning said lasing wavelength, comprising at least one of:
    first means for applying a first voltage between said first and second electrodes to change said first pitch of said upper chiral material layer such that said lasing wavelength is thereby selectably changed; and
    second means for applying a second voltage between said third and fourth electrodes to change said second pitch of said lower chiral material layer, such that said lasing wavelength is thereby selectably changed.

16. The chiral laser apparatus of claim 14, further comprising means for selecting direction of lasing, comprising one of:
    third means for applying a third voltage between said first and second electrodes to change said first pitch of said upper chiral material layer to a sufficient magnitude to prevent lasing from said upper chiral material layer such that lasing substantially occurs from said lower chiral material layer; and
    fourth means for applying a fourth voltage between said third and fourth electrodes to change said second pitch of said lower chiral material layer to a sufficient magnitude to prevent lasing from said lower chiral material layer such that lasing substantially occurs from said upper chiral material layer.

17. The chiral laser apparatus of claim 10, wherein said plural electrodes comprise a first electrode positioned between said upper chiral material layer and said middle light-emitting layer, said first electrode having a surface area substantially smaller than surface areas of said upper chiral material layer and said middle light-emitting layer, and a second electrode positioned between said middle light-emitting layer and said lower chiral material layer, said second electrode having a surface area substantially smaller than surface areas of said middle light-emitting layer and said lower chiral material layer, said first and said second electrodes being positioned in an offset relationship to one another, such that said charge current flows through said middle light-emitting layer so that laser light can escape the active region with reduced interaction with the electrodes.

18. The chiral laser apparatus of claim 1, wherein said first and said second pitch are equal to one another.

19. The chiral laser apparatus of claim 1, wherein said first and said second pitch are different from one another.

20. A chiral laser configured for connection to an electrical power source, the chiral laser comprising:
    a conductive cholesteric structure having a top portion and a bottom portion and configured to produce a photonic stop band having a first predefined wavelength range, said cholesteric structure being doped with an excitable light-emitting material;
    a first electrode, connected to the power source, positioned in contact with said top portion of said cholesteric structure; and
    a second electrode, connected to the power source, positioned in contact with said bottom portion of said cholesteric structure, wherein when the power source applies a charge current to said doped cholesteric structure via said first and second electrodes, said excitable light-emitting material within said cholesteric structure emits electromagnetic radiation, so that polarized lasing occurs in a direction perpendicular to said layered structure.

21. The chiral laser apparatus of claim 20, wherein said excitable light-emitting material comprises at least one material selected from a group consisting of: rare earth doped material, chelated rare earth doped material, semiconductor materials, organic light-emitting materials, conjugated polymers, dye-doped material, and materials containing color centers.

22. The chiral laser apparatus of claim 20, wherein at least one of said first and second electrodes is substantially transparent, such that when said charge current is applied to said cholesteric structure, lasing occurs perpendicular to and through said at least one substantially transparent electrode.

23. A chiral laser configured for connection to an electrical power source, the chiral laser comprising:
  a layered structure having a top portion and a bottom portion and configured to produce a photonic stop band having a first predefined wavelength range, said layered structure comprising:
    an upper chiral material layer having a first pitch,
    a middle excitable light-emitting layer, and
    a lower chiral material layer having a second pitch; and
  electrode means, connecting said layered structure and the power source, for providing a charge current across at least a portion of said layered dielectric to cause said middle light-emitting layer to emit electromagnetic radiation, such that lasing occurs in a direction perpendicular to said layered structure.

24. The chiral laser apparatus of claim 23, wherein said upper and lower chiral material layers are conductive, wherein said electrode means comprise a first electrode positioned above and in contact with said upper chiral material layer and a second electrode positioned below and in contact with said lower chiral material layer, such that said charge current is delivered to said middle light-emitting layer through said upper and lower chiral material layers, and wherein at least one of said first and second electrodes is substantially transparent, such that when said charge current is applied to said middle light-emitting layer, lasing occurs perpendicular to and through said at least one substantially transparent electrode.

25. A method of lasing utilizing a chiral structure comprising the steps of:
  (a) providing a layered structure having a top portion and a bottom portion and configured to produce a photonic stop band having a first predefined wavelength range, said layered structure comprising:
    an upper chiral material layer having a first pitch,
    a middle excitable light-emitting layer, and
    a lower chiral material layer having a second pitch; and
  (b) applying excitation to said layered structure to cause said middle light-emitting layer to emit electromagnetic radiation, such that polarized lasing at a lasing wavelength occurs in a direction perpendicular to said layered structure.

26. The method of lasing of claim 25, wherein said step (a) further comprises the steps of:
  (c) providing a middle light-emitting layer comprising a substantial defect therein; and
  (d) configuring said middle light-emitting layer to produce gain peaked at a wavelength substantially corresponding to a defect photonic state within said photonic stop band, such that maximum efficiency lasing occurs at said lasing wavelength corresponding to a position of a defect photonic state within said photonic stop band.

27. The method of lasing of claim 26, wherein said substantial defect comprises a defect material layer embedded within said middle light-emitting layer, and wherein said step (d) further comprises the step of:
  (e) configuring said defect material layer to produce a defect photonic state localized substantially at the center of said photonic stop band, said localized defect photonic state corresponding said lasing wavelength and to peak gain emission of said middle light-emitting layer.

28. The method of lasing of claim 27, wherein said defect material layer has an optical thickness of approximately one quarter of said lasing wavelength inside said layered structure.

29. The method of lasing of claim 25, wherein said step (a) comprises the step of:
  (f) providing a middle light-emitting layer composed of a material adapted to emit electromagnetic radiation upon application of an electromagnetic wave thereto; and wherein said step (b) comprises the step of:
  (g) applying said electromagnetic wave, from an electromagnetic wave source, to said layered structure to excite said middle light-emitting layer to emit electromagnetic radiation.

30. The method of lasing of claim 29, wherein said electromagnetic wave source is selected from a group consisting of: a laser, a flash lamp, focused sunlight, a light-emitting diode, and an electrically pumped electroluminescent material embedded within said middle light-emitting layer.

31. The method of lasing of claim 29, wherein said middle light-emitting layer comprises at least one material selected from a group consisting of: rare earth doped material, chelated rare earth doped material, semiconductor materials, organic light-emitting materials, conjugated polymers, dye-doped material, and materials containing color centers.

32. The method of lasing of claim 25, wherein said middle light-emitting layer does not comprise a substantial defect, further comprising the step of:
  (h) prior to said step (b), configuring said middle light-emitting layer to emit at peak gain at a wavelength range substantially corresponding to at least one selected mode at one band edge of said photonic stop band, such that maximum efficiency lasing occurs at a lasing wavelength selected from said wavelength range.

33. The method of lasing of claim 25, wherein said upper and lower chiral material layers are selected from a group consisting of: cholesteric liquid crystal, conjugated polymer chiral material, artificially created chiral structure, and naturally occurring chiral structure.

34. The method of lasing of claim 25, wherein said middle light-emitting layer is composed of a material adapted to emit electromagnetic radiation upon application of a charge current thereto, and wherein said step (b) comprises the step of:
  (i) providing and connecting a plurality of electrodes to said layered structure;
  (j) providing and an electrical power source connected to said plurality of electrodes; and
  (k) selectively activating said electrical power source to provide said charge current to the said layered structure to excite said middle light-emitting layer to emit electromagnetic radiation.

35. The method of lasing of claim 25, wherein said first and said second pitch are equal to one another.

36. The method of lasing of claim 25, wherein said first and said second pitch are different from one another.

37. A method of lasing utilizing a chiral laser configured for connection to an electrical power source, said method comprising the steps of:

(a) providing a conductive cholesteric structure having a top portion and a bottom portion and configured to produce a photonic stop band having a first predefined wavelength range;

(b) doping said cholesteric structure with an excitable light-emitting material;

(c) positioning a first electrode, connected to the power source, in contact with said top portion of said cholesteric structure;

(d) positioning a second electrode, connected to the power source, in contact with said bottom portion of said cholesteric structure; and (e) applying a charge current, by the power source, to said doped cholesteric structure via said first, and second electrodes, causing said excitable light-emitting material within said cholesteric structure to emit electromagnetic radiation such that polarized lasing occurs in a direction perpendicular to said layered structure.

* * * * *